United States Patent
Li et al.

(10) Patent No.: US 6,543,741 B1
(45) Date of Patent: Apr. 8, 2003

(54) VIBRATION ISOLATION FOR A TRANSVERSELY MOUNTED COMPRESSOR

(75) Inventors: Wenlong Li, Fayetteville, NY (US); Peter R. Bushnell, Cazenovia, NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/025,939

(22) Filed: Dec. 26, 2001

(51) Int. Cl.[7] .................................................. F16M 1/00
(52) U.S. Cl. ...................................................... 248/638
(58) Field of Search ................................ 248/638, 672, 248/634, 636, 562; 267/141, 141.2

(56) References Cited

U.S. PATENT DOCUMENTS

| | | | |
|---|---|---|---|
| 5,306,121 A | * | 4/1994 | Heflin et al. ................. 417/363 |
| 5,810,322 A | | 9/1998 | Zhao et al. |
| 5,964,579 A | * | 10/1999 | Tang et al. ................... 417/363 |
| 6,132,183 A | * | 10/2000 | Li et al. ....................... 417/363 |
| 6,336,794 B1 | * | 1/2002 | Kim ............................. 417/363 |
| 6,378,832 B1 | * | 4/2002 | Li et al. ....................... 248/637 |

* cited by examiner

Primary Examiner—Ramon O. Ramirez
Assistant Examiner—A. Joseph Wujciak, III

(57) ABSTRACT

A horizontally mounted compressor is supported from below by a vibration isolator located as close as practical to the vertical projection of the center of gravity of the compressor and this isolator supports most, if not all, of the weight of the compressor. The ends of the compressor are supported by isolators located as close as practical to the axis of the compressor.

9 Claims, 6 Drawing Sheets

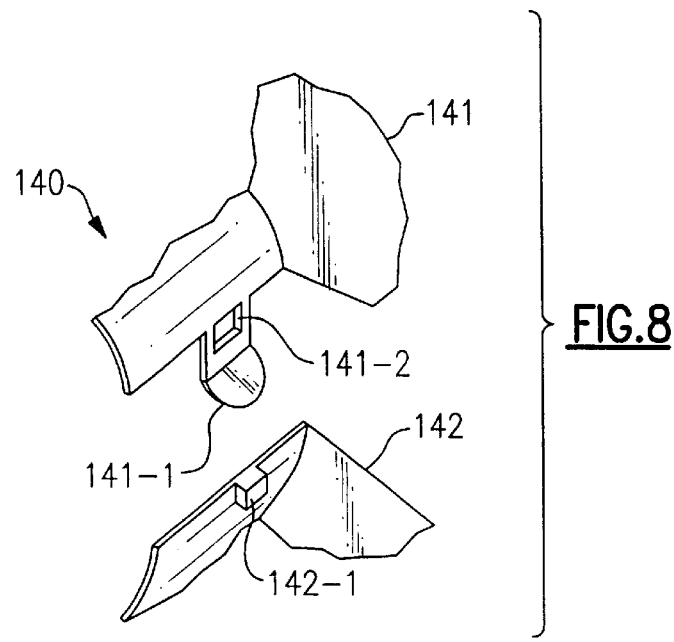
FIG. 8
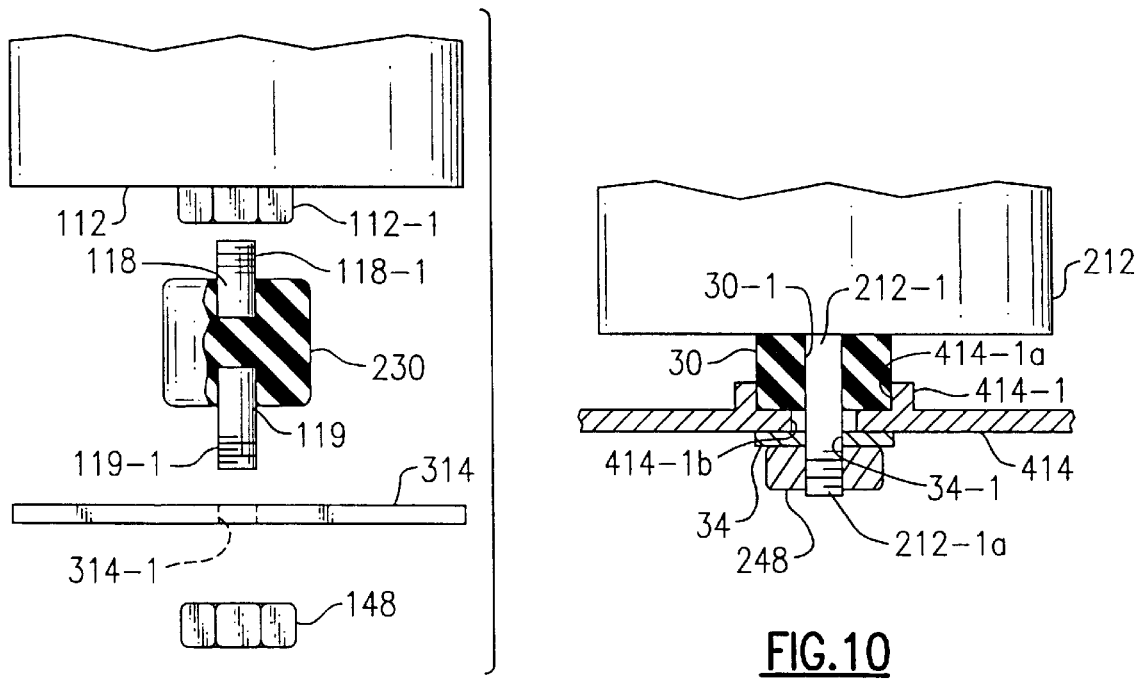
FIG. 9
FIG. 10

US 6,543,741 B1

VIBRATION ISOLATION FOR A TRANSVERSELY MOUNTED COMPRESSOR

BACKGROUND OF THE INVENTION

A hermetic compressor, such as that in a window room air conditioner, is conventionally contained within a generally cylindrical shell secured in some fashion to the unit housing and connected to other elements in the system through a suction and a discharge line. The axis of the shell, the motor rotor and stator, and the portion of the shaft carrying the rotor are all, nominally, coaxial. If the compressor is vertically oriented, the center of gravity would tend to be quite close to the axis of the shell. The forces produced by the motor and pump structure during operation of the compressor will tend to cause rotational movement of the shell which will tend to produce movement through the suction and discharge lines.

If the compressor is placed in a horizontal orientation, the oil sump will shift from a position centered on the axis of the shell to the side of the shell and at a distance which is a significant percentage of the shell radius. So, the location of the center of gravity will be changed as well as the direction in which it acts. U.S. Pat. No. 5,810,322 discloses a horizontal compressor which is secured at its bottom to one leg of each of two L-shaped brackets and is integral therewith. The other legs of the two L-shaped brackets are secured to a support through a pin and grommet. Thus, the entire support of the integral L-shaped brackets and compressor is through the pins which are, nominally, aligned with the axis of the compressor. The L-shaped brackets can serve as linkages relative to the exertion of forces produced during operation of the compressor and the support provided by the pins. The pins are rectangular, as is the pin socket, so as to resist rotation.

U.S. Pat. No. 6,132,183 discloses a vertical compressor and a number of mounting configurations. In each configuration most, if not all, of the weight is supported by a vibration isolator. Torsion isolation is provided through a plurality of torsion isolators which are located radially with respect to the axis of the compressor shell.

SUMMARY OF THE INVENTION

A pin located as close as practical to the center of gravity extends radially downward from the shell of a horizontally mounted compressor. The radial pin is received in an isolator which supports most of the weight of the compressor. The bottom isolator is suitably supported and/or secured to the base pan of the room air conditioner. Pins extend from each end of the shell as close as is practical to the axis of the compressor shell and are supported by isolators secured in suitable supports. The compressor may be located in a shell-type enclosure which supports the isolators while providing sound insulation.

It is an object of this invention to eliminate the need for a compressor baseplate and its accompanying sound emission.

It is another object of this invention to facilitate grommet installation.

It is a further object of this invention to reduce grommet failure. These objects, and others as will become apparent hereinafter, are accomplished by the present invention.

Basically, a horizontally mounted compressor is supported from below by a vibration isolator located as close as practical to the vertical projection of the center of gravity of the compressor and this isolator supports most, if not all, of the weight of the compressor. The ends of the compressor are supported by isolators located as close as practical to the axis of the compressor.

BRIEF DESCRIPTION OF THE DRAWINGS

For a fuller understanding of the present invention, reference should now be made to the following detailed description thereof taken in conjunction with the accompanying drawings wherein:

FIG. 8 is a partial view of an alternative attachment structure for the FIG. 6 embodiment;

FIG. 9 is an exploded view of a second alternative bottom mounting structure; and FIG. 10 is a partially sectioned view of a third alternative bottom mounting structure.

DESCRIPTION OF THE PREFERRED EMBODIMENTS

Figure 1:
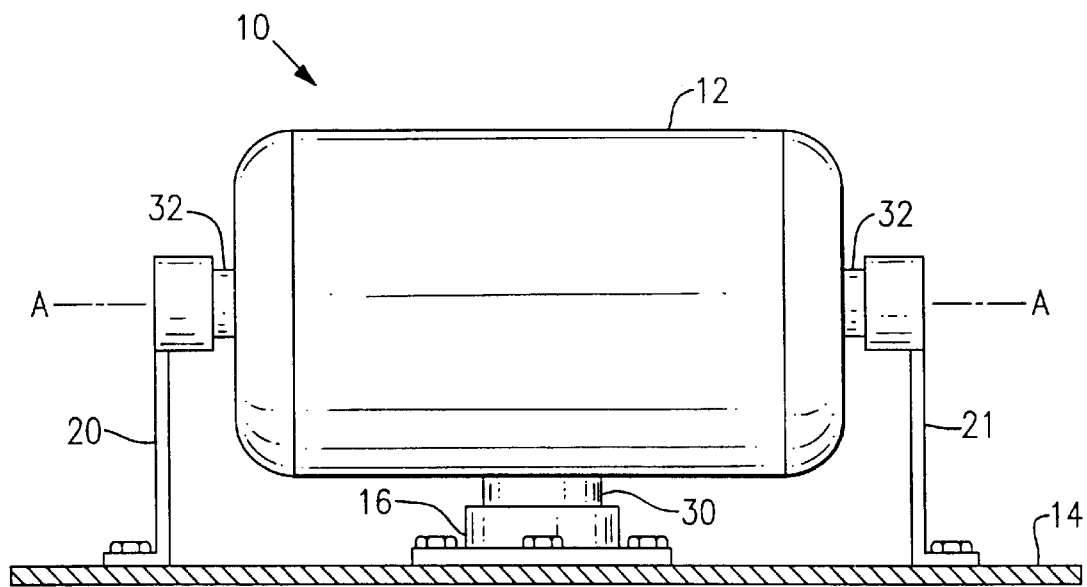
FIG. 1 is a side view of a compressor mounted according to the teachings of the present invention.
Figure 2:
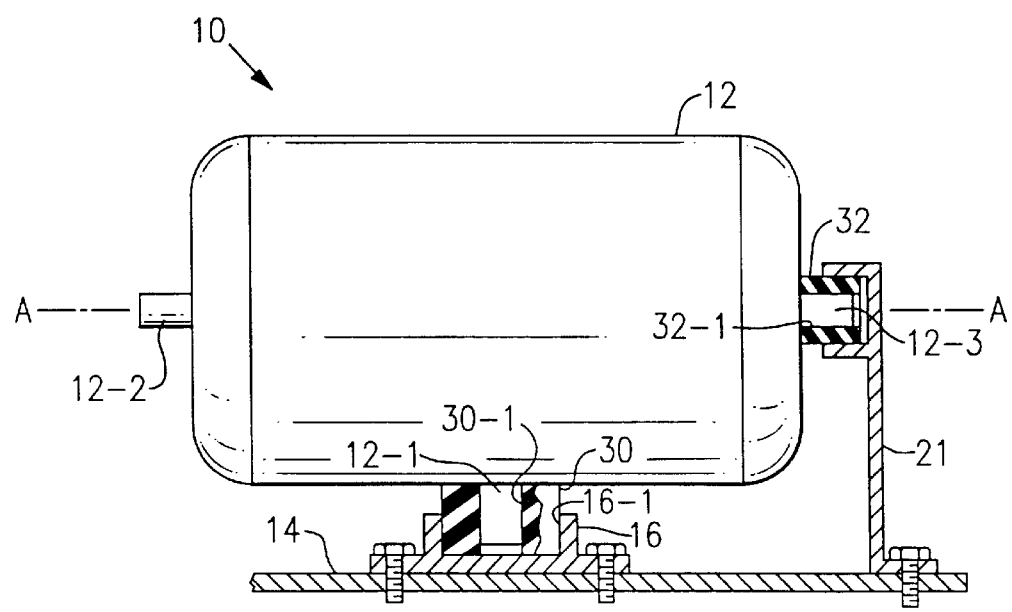
FIG. 2 is a partially sectioned view of a portion of FIG. 1.
Figure 3:
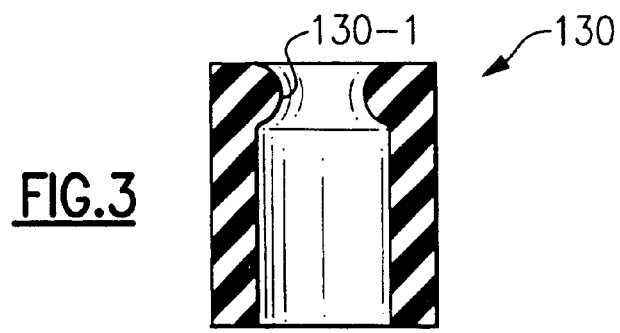
FIG. 3 is a sectional view of a modified grommet.

In FIGS. 1 and 2, the numeral 10 generally designates a window room air conditioner of which only compressor 12 and base pan 14 are illustrated. Compressor 12 will have suction and discharge lines connected thereto as well as an electrical supply connection and these will be specific to the design of air conditioner 10 and will dictate the specifics of where compressor 12 can be supported. Their illustration would only complicate an understanding of the present invention. Referring to FIGS. 1 and 2, vibration isolator 30 is located beneath compressor 12 and is received in bore 16-1 of isolator mounting 16 which is illustrated as a separate member suitably secured to base pan 14 but may be integral with base pan 14. Pin, or stud, 12-1 is secured to compressor 12 and extends radially downward from compressor 12. Pin 12-1 is snugly received in bore 30-1 of vibration isolator 30. The location of pin 12-1 and of its supporting isolator 30 should be as close as possible to the vertical projection of the center of gravity of compressor 12. The maximum deviation from the vertical projection should never exceed 25% of the axial length of compressor 12. Vibration isolator 30 supports most, if not all, of the weight of compressor 12. Referring to FIG. 3, vibration isolator 130 is illustrated which may be used in place of vibration isolator 30. Vibration isolator 130 differs from vibration isolator 30 in that it has a throat 130-1 rather than a uniform bore 30-1. Vibration isolator 130 has a relatively high stiffness in the vertical direction and a much lower stiffness in the transverse directions to ensure a sufficiently low natural frequency for the torsional mode. The different stiffnesses are due to the fact that in vertical support the isolators 30 and 130 are essentially an annular cylinder whereas only throat 130-1 of isolator 130 coacts with pin 12-1 in the transverse directions but the entire bore 30-1 which is coextensive with pin 12-1 coacts therewith. As a result of only throat 130-1 of isolator 130 coacting with pin 12-1, the throat 130-1 can act as a fulcrum relative to pin 12-1 thereby permitting some transverse movement of compressor 12.

Compressor 12 is supported at its ends by vibration isolators 32 which are smaller than vibration isolators 30 and 130 and are supported by brackets 20 and 21. Other than being of a larger size, vibration isolator 130 of FIG. 3 illustrates an alternative to isolator 32. Pins, or studs, 12-2 and 12-3 extend in axial directions from respective ends of compressor 12. Preferably pins 12-2 and 12-3 are coaxial and located along the axis A—A of compressor 12. The location of compressor structure which is not illustrated will dictate the location of pins 12-2 and 12-3 as well as their support brackets 20 and 21. The displacement of pins 12-2 and 12-3 from the axis A—A of compressor 12 should be as small as practical but no more than 66% of the radius of the shell of compressor 12. Pins 12-2 and 12-3 are received in identical vibration isolators 32 which are received in and supported by brackets 20 and 21, respectively. Isolators 32 have a much lower stiffness in all directions than isolators 30 and 130. Isolators 32 may have a uniform bore 32-1, as illustrated, or may have a throat portion corresponding to throat 130-1 of vibration isolator 130. If pins 12-2 and 12-3 are coaxial, brackets 20 and 21 will be identical. If pins 12-2 and 12-3 are not coaxial, the brackets 20 and 21 will differ so as to accommodate the different distances between pins 12-2 and 12-3 and the base pan 14 and any interfering structure (not illustrated) but will otherwise be the same.

Figure 4:
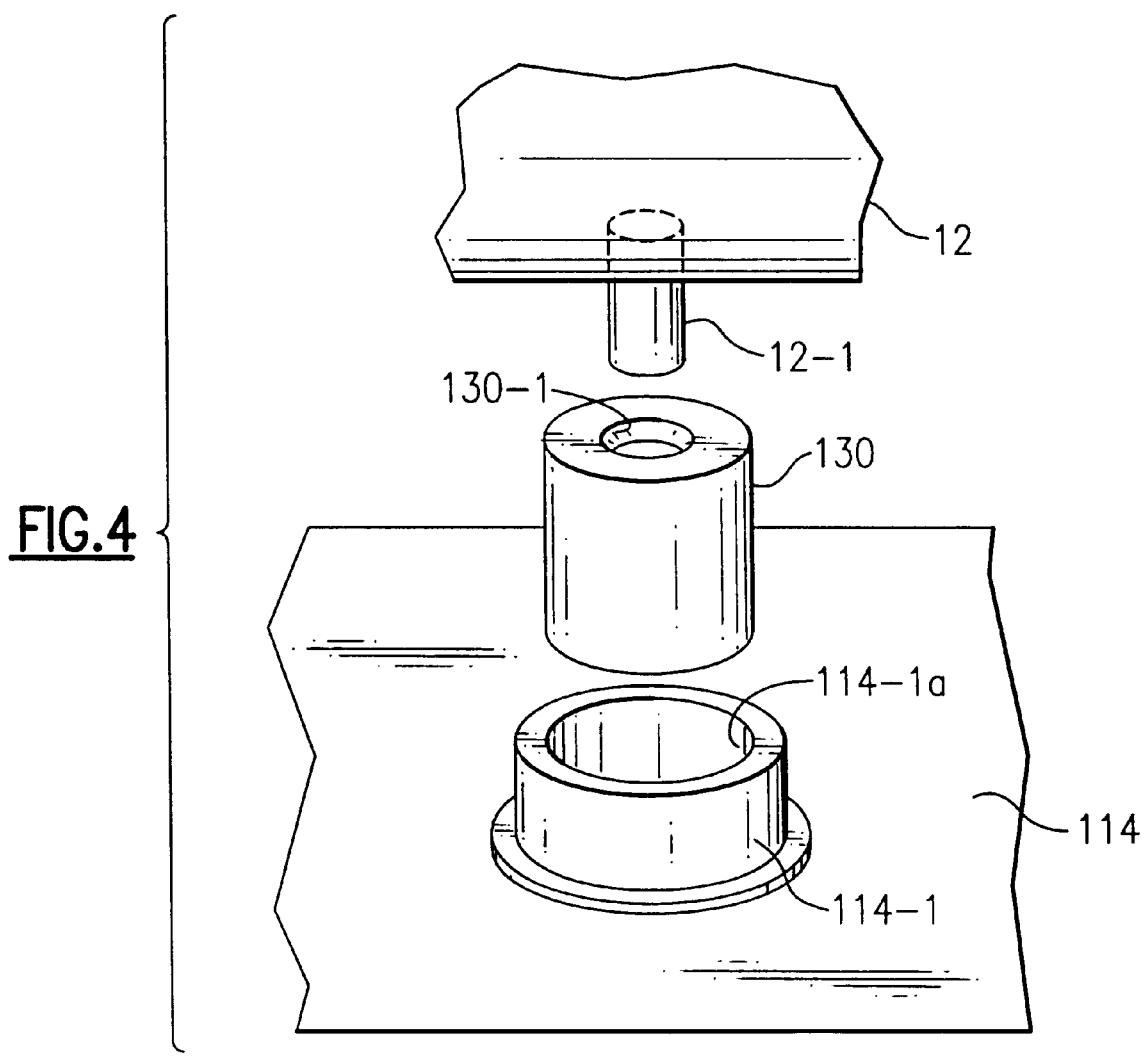
FIG. 4 is an exploded view of the bottom mounting structure.

FIG. 4 illustrates an isolator mounting 114-1 which is integral with base pan 114. Mounting 114-1 has a bore 114-1a which receives vibration isolator 130. Pin 12-1 of compressor 12 is received in throat 130-1 of vibration isolator 130.

Figure 5:
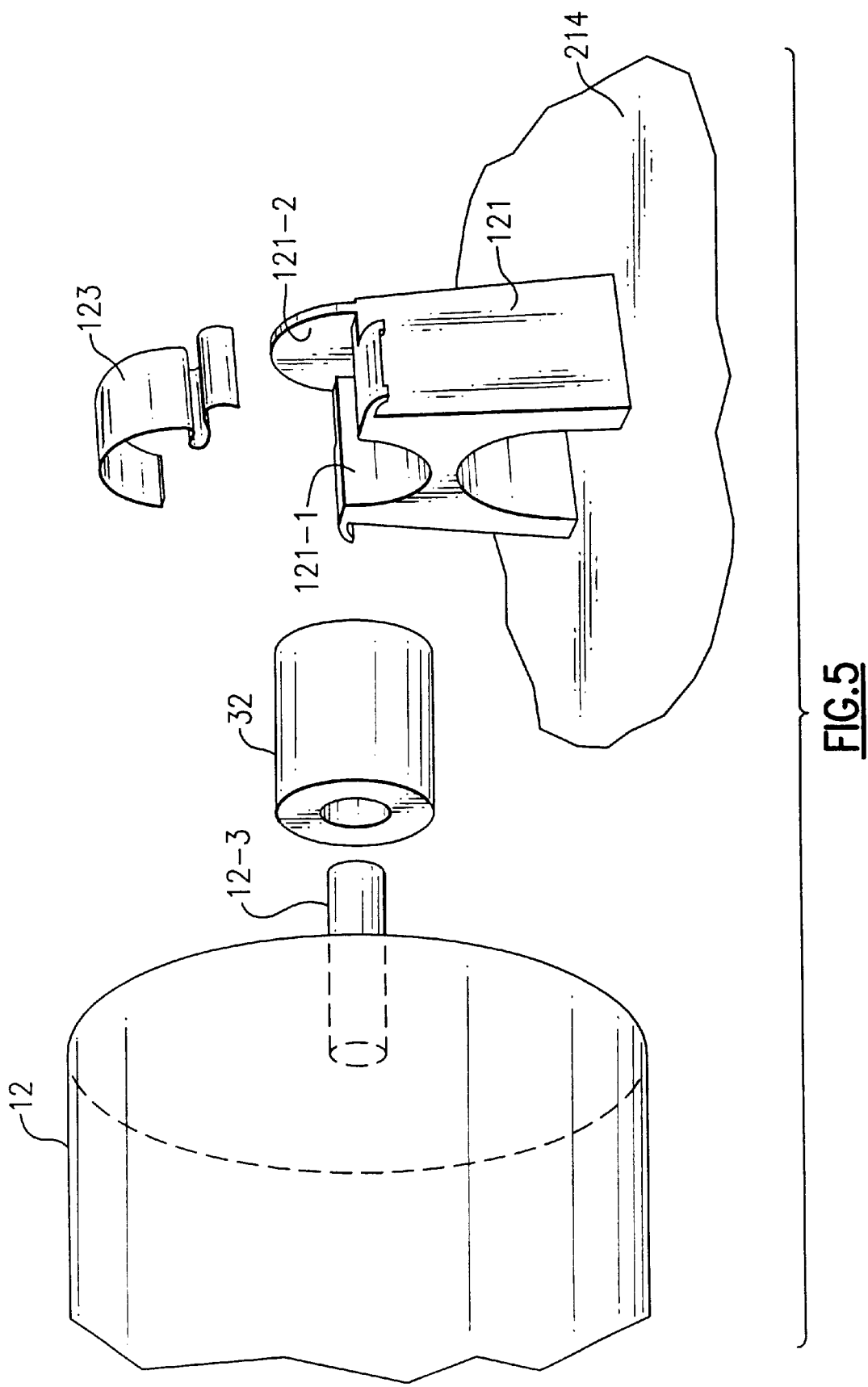
FIG. 5 is an exploded view of a modified end mounting structure.

Referring now to FIG. 5 which is specific to pin 12-3 and bracket 121 but which will also apply to pin 12-2 and its corresponding bracket (not illustrated), pin 12-3 is received in isolator 32. Isolator 32 is, in turn, received in and supported by bracket 121. Bracket 121 has a semi-cylindrical recess portion 121-1 preferably extending at least 180° for receiving isolator 32 and an end wall portion 121-2 for limiting axial movement of isolator 32 and thereby compressor 12. Cover 123 coacts with bracket 121 to hold isolator 32 in place. Bracket 121 is integral with or suitably secured to base pan 214. Isolators 32 may have a uniform bore 32-1, as illustrated, or may have a throat portion corresponding to throat 130-1 of vibration isolator 130.

In operation, the rotation of the rotor, crankshaft and pump structure within the shell of compressor 12 tends to produce a rotary motion of compressor 12 about axis A—A. If pins 12-2 and 12-3 are coaxial, the motion will tend to be about their common axis and within isolators 32. If pins 12-2 and 12-3 are not coaxial, the specific geometry of the pins and forces will tend to produce rotary movement of one pin with respect to the other and a tendency to move the one of isolators 32 associated with the rotary movement of one pin. Pin 12-1 coacting with isolator 30 or 130 tends to resist all rotary and axial movement of compressor 12. As noted above, the resistance to rotary and axial movement will be greater for isolator 30 then for isolator 130. Because isolator 30 or 130 supports most of the weight of compressor 12, the deformation of isolator 30 or 130 tends to cause pin 12-1 to be more securely gripped thereby enhancing resistance to axial and rotary movement of pin 12-1 and thereby compressor 12.

Figure 6:
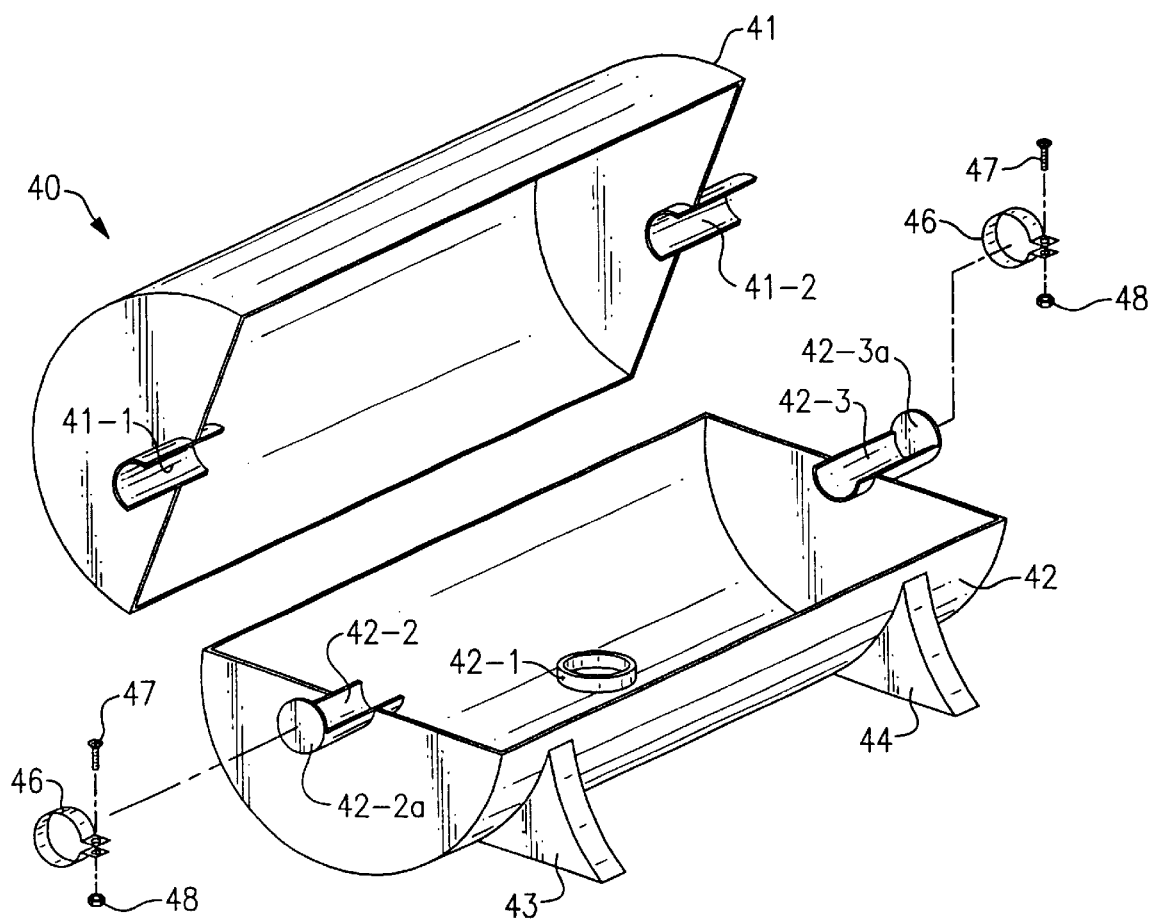
FIG. 6 is an exploded view of a modified mounting arrangement.
Figure 7:
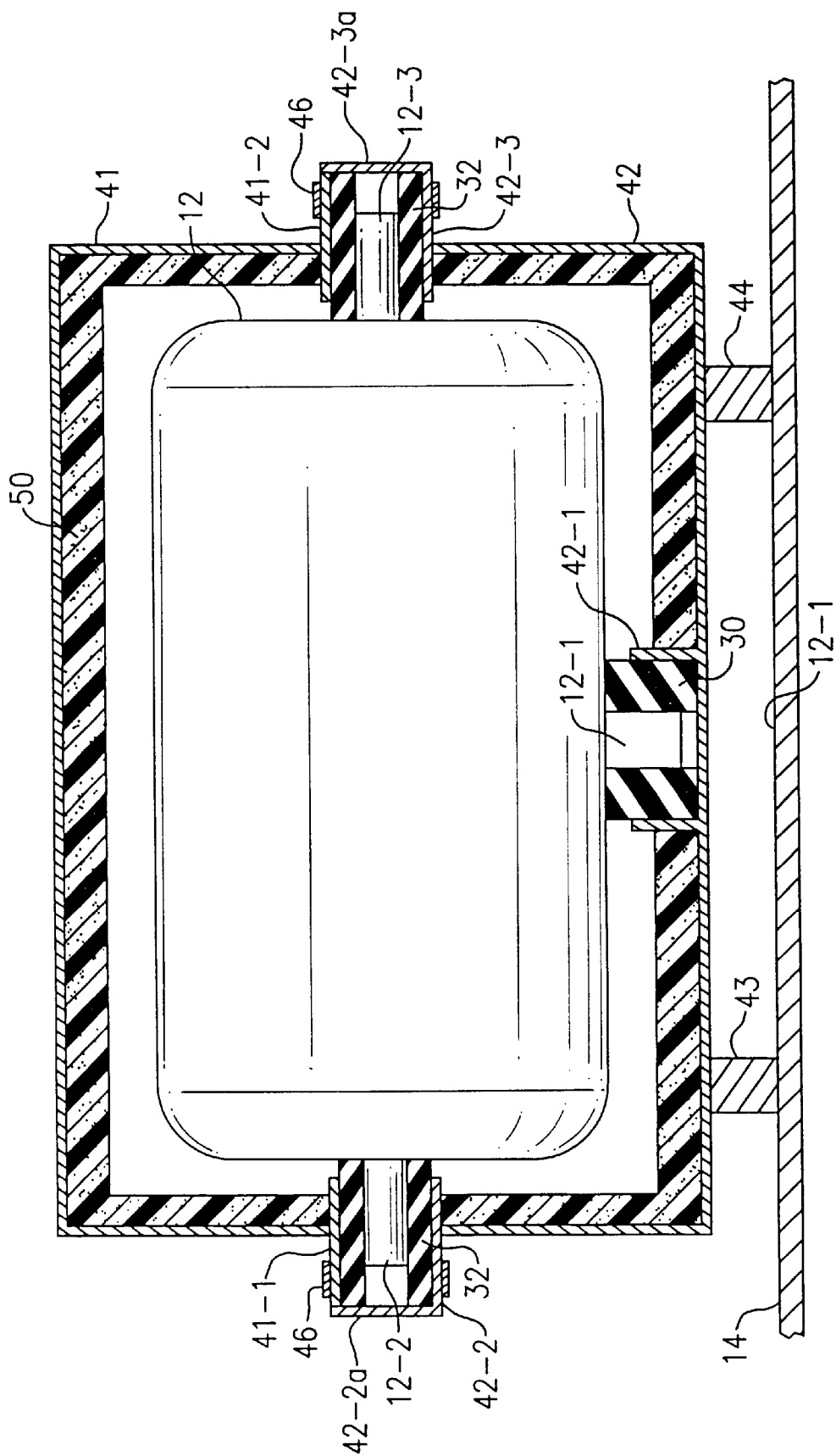
FIG. 7 is a partially sectioned view of a compressor supported by the mounting arrangement of FIG. 6.

Referring to FIGS. 6 and 7, a shell-type of enclosure 40 can be employed to support compressor 12 on base pan 14 and permit the elimination of brackets 20, 21 and 121 while attenuating sound radiation. Enclosure 40 is made up of an upper half 41 and a lower half 42. The openings in enclosure 40 for the suction and discharge lines and the electrical supply connection have not been illustrated since they will be specific to the compressor. Lower half 42 has a radially extending collar 42-1 at its bottom for receiving isolator 30 which, in turn, receives pin 12-1 of compressor 12. Half tube portions 42-2 and 42-3 are formed at each end of lower half 42 for receiving isolators 32. The outer ends of tube portions 42-2 and 42-3 define wall portions 42-2a and 42-3a, respectively, which keep isolators 32 axially in place. Half tube portions 41-1 and 41-2 are formed at each end of upper half 41 and coact with half tube portions 42-2 and 42-3, respectively, for keeping isolators 32 axially and radially in place. The location of collar 42-1 and half tubes 41-1, 41-2, 42-2, and 42-3 will depend upon the location of pins 12-1, 12-2 and 12-3 as in the embodiments of FIGS. 1–4. Lower half 42 of enclosure 40 is supported by legs 43 and 44 which can be integral with half 42 and suitably secured to base pan 14, may be integral with base pan 14, or may be separate pieces secured to base pan 14. Legs 43 and 44 will be located in accordance with the room available for a specific compressor design. While two legs, 43 and 44, are illustrated, one or three or more legs may also be used where necessary, or desired. Upper half 41 and lower half 42 of enclosure 40 are held together by clamps 46, bolts 47 and nuts 48 with clamps 46 encircling half tube portions 41-1 and 42-3 as well as 41-2 and 42-3.

Referring specifically to FIG. 7, compressor 12 is illustrated within enclosure 40. Insulation 50 is located within enclosure 40 and surrounding compressor 12. The use of insulation 50 is optional, but preferred, since it reduces sound transmission. If the space between enclosure 40 and compressor 12 is filled with insulation, the insulation will resist movement of compressor 12 and the attendant sound generation.

FIG. 8 illustrates attachment structure which is integral with the enclosure 140 and replaces clamp 46, bolt 47 and nut 48. Enclosure 140 includes an upper half 141 having a tab 141-1 with an opening 141-2 therein. Lower half 142 of enclosure 140 has a projection 142-1 which is received in opening 141-2 to secure halves 141 and 142 together. Structure corresponding to tab 141-1, opening 141-2 and projection 142-1 will also be located at the other ends (not illustrated) of halves 141 and 142.

In the embodiments of FIGS. 1, 2, 4, 6 and 7 most, if not all, of the weight of the compressor 12 is supported by vibration isolator 30 or 130. However, it is only the weight of compressor 12 acting on vibration isolator 30 or 130. If necessary, or desired, the vibration isolator located beneath the compressor may be subjected to compressive or tensile forces in addition to those forces supplied by the weight of the compressor acting on the vibration isolator.

In FIG. 9, compressor 112 has a nut 112-1 or corresponding structure suitably secured thereto or integral therewith at a location corresponding to a radially downward direction when compressor 112 is in place in a room air conditioner or the like. Pins 118 and 119 are coaxial and axially separated and extend from vibration isolator 230 with threaded portion 118-1 being threaded into nut 112-1 and threaded portion 119-1 passing through bore 314-1 in base pan 314 and has nut 148 threaded thereon. Unlike other embodiments, vibration isolator 230 is not circumferentially supported. The tightening of nut 148 on threaded portion 119-1 will draw vibration isolator 230 and compressor 12 towards base pan 314. This permits vibration isolator 230 to be placed in tension even though it is being acted on by the weight of compressor 112 and this results in a greater resistance to movement of compressor 112 and a corresponding reduction in noise generation.

The embodiment of FIG. 10 is a combination of the embodiments of FIGS. 4 and 9. As in the case of the FIG. 4 embodiment, pin 212-1 is secured to compressor 212 and isolator mounting 414-1 is integral with base pan 414. As in the case of the FIG. 9 embodiment, pin 212-1 has a threaded portion 212-1a which extends through bore 414-1b and is received in nut 248. Vibration isolator 30 is received in bore 414-1a. Pin 212-1 serially extends through bore 30-1 in isolator 30, bore 414-1b in base pan 414, bore 34-1 in neoprene washer 34 into nut 248. The tightening of nut 248 on threaded portion 212-1 a draws compressor 212 towards base pan 414 and can squeeze vibration isolator 30 more than would be due to just the weight of compressor 212 acting on vibration isolator 30. The clearance between pin 212-1 and bore 414-1b and the placing of resilient material washer 34 between base pan 414 and nut 248 eliminates any metal to metal path between compressor 212 and base pan 414.

From the foregoing it should be clear that the present invention teaches the supporting of a compressor by three isolation mounts which have or receive pins therein. The isolation mounts are made of neoprene or other suitable elastomeric materials. One of the vibration mounts is located beneath the compressor and supports most, if not all of the weight of the compressor and, in some embodiments is further compressed, or placed in tension, by tightening a nut. A pin extends from each end of the compressor. Ideally the axis of the compressor and that of the pins would be coaxial. Realistically, the axes will be parallel but as close as possible to being coaxial with the compressor. To the extent that the pins are not coaxial, the support structure will be modified to accommodate the different locations relative to the base pan but the basic structure supporting the pin at each end of a compressor will be the same.

Although preferred embodiments of the present invention have been illustrated and described, other changes will occur to those skilled in the art. It is therefore intended that the scope of the present invention is to be limited only by the scope of the appended claims.

What is claimed is:

1. Apparatus for mounting a compressor comprising:

a horizontally oriented compressor having a first and second end and an axis;

an axially extending pin located at each end of said compressor with said axially extending pin being parallel with said axis;

a radially extending pin extending downward from said compressor;

first means for providing vibration isolation receiving said radially extending pin and having a greater stiffness in a vertical direction than a transverse direction and supporting most of the weight of said compressor;

second means for providing vibration isolation receiving each of said axially extending pins; and means for supporting each of said means for providing vibration isolation.

2. The apparatus for mounting a compressor of claim 1 wherein said means for supporting said first means is a base pan.

3. The apparatus for mounting a compressor of claim 1 wherein said first and second means are in an enclosure containing said compressor.

4. The means for mounting a compressor of claim 3 further including insulation located between said compressor and said enclosure.

5. The apparatus for mounting a compressor of claim 1 wherein said radially extending pin coacts with a nut to compress said first means.

6. The apparatus for mounting a compressor of claim 1 wherein said radially extending pin is axially spaced from a coaxial pin which coacts with a nut to place said first means in tension.

7. The apparatus for mounting a compressor of claim 1 wherein said first means includes a vibration isolator which has a throat which receives said radially extending pin.

8. The apparatus for mounting a compressor of claim 1 wherein said means for supporting said second means includes a bracket associated with each axially extending pin and the corresponding second means which is received in a recess formed in said bracket and a cover coacting with said recess to circumferentially and axially secure said corresponding second means.

9. The apparatus for mounting a compressor of claim 1 wherein said second means includes vibration isolators which have throats which receive said axially extending pins.

* * * * *